United States Patent
Zhang et al.

(10) Patent No.: US 11,544,046 B1
(45) Date of Patent: Jan. 3, 2023

(54) DYNAMIC CLOUD ANTI-PATTERN DETECTION FOR A MODERNIZATION ASSESSMENT SERVICE

(71) Applicant: Amazon Technologies, Inc., Seattle, WA (US)

(72) Inventors: Jiangtao Zhang, Pleasanton, CA (US); Gunja Agrawal, San Jose, CA (US); Vijay Dheeraj Reddy Mandadi, Fremont, CA (US); Ting Hsiang Eddy Chu, San Jose, CA (US); Bharath Bhoopalam, Sane Jose, CA (US)

(73) Assignee: Amazon Technologies, Inc., Seattle, WA (US)

(*) Notice: Subject to any disclaimer, the term of this patent is extended or adjusted under 35 U.S.C. 154(b) by 114 days.

(21) Appl. No.: 17/003,568

(22) Filed: Aug. 26, 2020

(51) Int. Cl.
G06F 8/41 (2018.01)
G06N 5/04 (2006.01)
G06F 8/65 (2018.01)

(52) U.S. Cl.
CPC .............. *G06F 8/433* (2013.01); *G06F 8/427* (2013.01); *G06F 8/65* (2013.01); *G06N 5/04* (2013.01)

(58) Field of Classification Search
CPC ..... G06F 8/65; G06F 8/71; G06F 8/72; G06F 8/751; G06F 8/77; G06F 8/36; G06F 8/443
See application file for complete search history.

(56) References Cited

U.S. PATENT DOCUMENTS

| | | | | |
|---|---|---|---|---|
| 11,354,120 B1* | 6/2022 | Zhang | .................. | G06F 8/76 |
| 11,385,892 B1* | 7/2022 | Zhang | .................. | G06F 9/547 |
| 2006/0053422 A1* | 3/2006 | Alikacem | ............... | G06F 9/524 |
| | | | | 718/100 |
| 2017/0177461 A1* | 6/2017 | Altman | ............... | G06F 11/0793 |
| 2021/0182703 A1* | 6/2021 | Velammal | ............... | G06N 5/046 |
| 2021/0406004 A1* | 12/2021 | Ray | ........................ | G06F 8/77 |

* cited by examiner

*Primary Examiner* — Duy Khuong T Nguyen
(74) *Attorney, Agent, or Firm* — Nicholson De Vos Webster & Elliott LLP

(57) ABSTRACT

Techniques are described for enabling an application modernization system to efficiently identify various types of software development "anti-patterns" (including cloud anti-patterns) associated with software applications. An anti-pattern is broadly any characteristic of a software application or system that represents an undesirable or suboptimal solution to a problem within a given software design context. Depending on the particular software design context, examples of possible anti-patterns and cloud anti-patterns can include the use of insecure network protocols, an application's reliance on local file system access, the use of a deprecated or outdated class, function, or library, etc. An application modernization system described herein includes a modernization assessment client application that identifies the presence of anti-patterns in users' software applications using a collection of anti-pattern definitions (e.g., defined based on an anti-pattern definition syntax) obtained from an application modernization service of a cloud provider network.

20 Claims, 8 Drawing Sheets

ANTI-PATTERN DEFINITIONS 112

...

:FixedIP
  rdf:type :AntiPattern ;
  rdfs:label "FixedIP"@en ;
  rdfs:comment "Hard coding the IP address of other hosts breaks the application when we try to port it over to the cloud."@en ;
  :hasCost [
    a :Cost ;
    :hasDuration 15 ;
    :hasUnit :Day ;
  ] ;
  :hasDefinition [
    a :Definition ;
    :hasLanguage :CSharp ;
    :hasRuleSet [
      a :RuleSet ;
      # Find static IP addresses
      :hasSubRuleSet [
...
  ] ;

...

ANTI-PATTERN DEFINITIONS 112

ANTI-PATTERN ANALYZER(S) 134

ANALYSIS FUNCTIONS 400

SOFTWARE APPLICATION 106

APPLICATION ARTIFACTS 402

CONFIGURATION FILES 406

SOURCE CODE 404

```
....
using System;
using System.Net;
using System.Net.Sockets;
namespace Server123 {
    class Program {
        static void Main(string[] args) {
            try
            {
                IPAddress ipAd = IPAddress.Parse("10.18.227.162");
                TcpListener myList = new TcpListener(ipAd, 8001);
                ...
            }
        }
    }
}
...
```

BYTECODE 408

*FIG. 4*

DYNAMIC CLOUD ANTI-PATTERN DETECTION FOR A MODERNIZATION ASSESSMENT SERVICE

BACKGROUND

Modernizing software applications is a common task for business organizations and other entities desiring to improve their information technology (IT) environments in response to changing software application use cases, resource demands, and user access patterns. For example, while many legacy applications were designed for older operating environments with lesser expectations, modern applications now often need the ability to scale quickly to potentially millions of users, have global availability, manage very large amounts of data, and respond to requests in milliseconds. The processes for upgrading, converting, rewriting, etc., such applications to enable improved performance is referred to generally as software modernization. Software application and software-based system modernization can include, for example, porting legacy applications or systems to modern computer programming languages or application frameworks, updating software libraries, protocols, or hardware platforms, and the like. For organizations desiring to make use of cloud provider network resources, the modernization process can further include migrating resources from an organization's on-premises environment to a cloud provider network, modernizing an application's architecture with containers, serverless functions, and other more scalable architecture tools provided by cloud provider networks.

BRIEF DESCRIPTION OF DRAWINGS

Various embodiments in accordance with the present disclosure will be described with reference to the drawings, in which:

FIG. 4 is a diagram illustrating the identification of anti-patterns by an anti-pattern analyzer based on anti-pattern definitions obtained from an application modernization service according to some embodiments.

DETAILED DESCRIPTION

Figure 1:
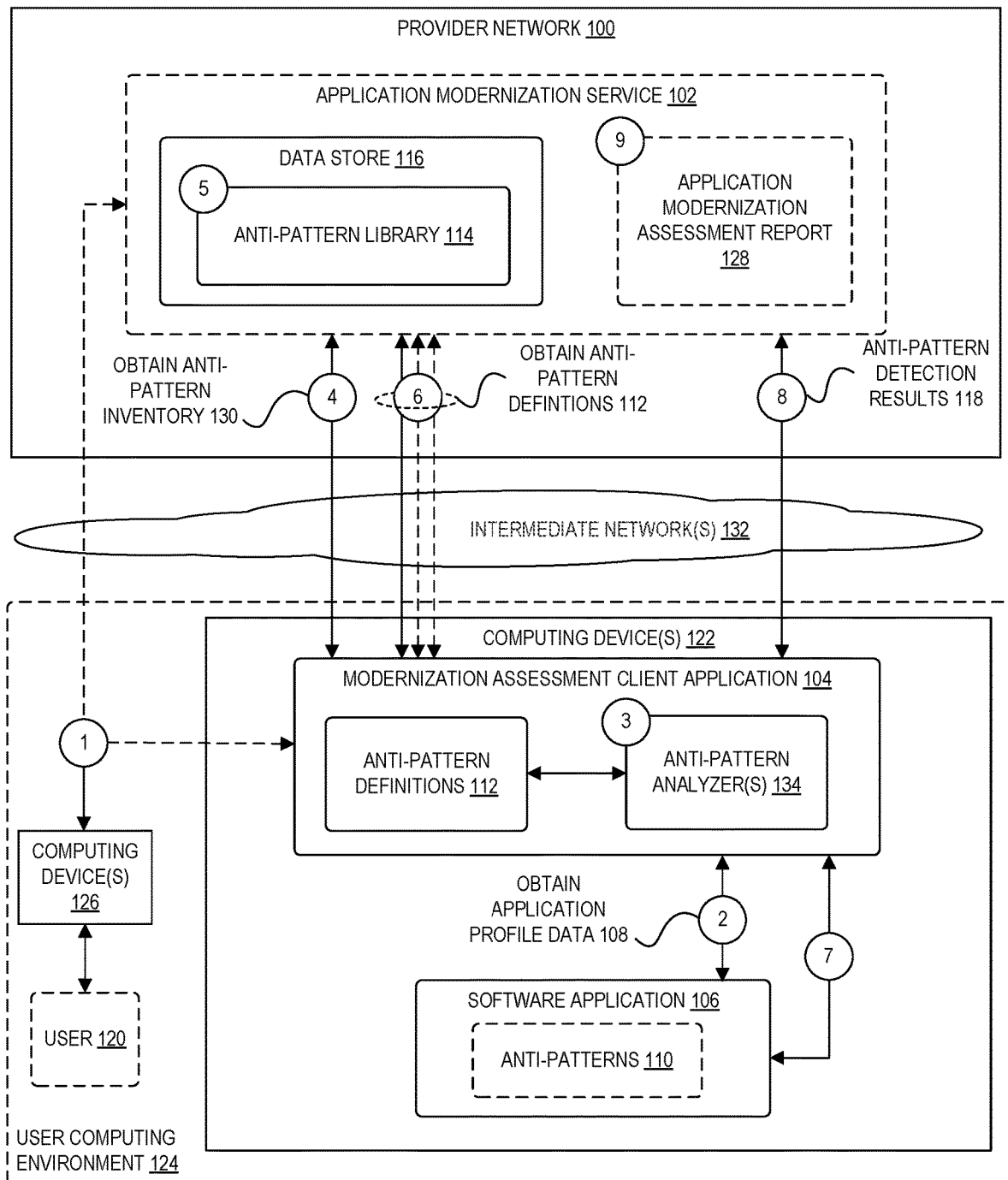
FIG. 1 is a diagram illustrating a computing environment that enables an application modernization system to identify anti-patterns, including cloud anti-patterns, in software applications according to some embodiments.

The present disclosure relates to methods, apparatus, systems, and non-transitory computer-readable storage media for enabling an application modernization system to efficiently identify various types of software development "anti-patterns" (including cloud anti-patterns) associated with software applications undergoing software modernization processes (e.g., as part of modernization processes aimed at migrating users' applications to a cloud service provider's infrastructure). An anti-pattern is broadly any characteristic of a software application or system that represents an undesirable or suboptimal solution to a problem within a given software design context. A cloud anti-pattern similarly represents any characteristic of a software application that may prevent or hinder an application's implementation or migration to a cloud service provider's infrastructure. Depending on the particular software design context and the type of modernization processes to be performed, examples of possible anti-patterns and cloud anti-patterns can include the use of insecure network protocols, an application's reliance on local file system access, the use of a deprecated or outdated class, function, or library, and the like.

According to various embodiments, the application modernization system described herein includes a modernization assessment client application that is able to identify the presence of anti-patterns in users' software applications based on a collection of anti-pattern definitions (e.g., defined based on an anti-pattern definition syntax designed to describe various different types of anti-patterns) obtained from an application modernization service of a cloud provider network. In some embodiments, the application modernization system is implemented such that the creation and management of the anti-pattern definitions is decoupled from the logic of the modernization assessment client application used to identify anti-patterns in applications based on the anti-pattern definitions. In this manner, an application modernization service can separately manage and update a library of anti-pattern definitions over time (e.g., to modify existing anti-pattern definitions, to add new anti-pattern definitions, etc.) without necessitating changes to the modernization assessment client applications used across any number of user computing environments where modernization efforts are taking place.

Software modernization broadly refers to converting, rewriting, or porting legacy software applications or systems to more modern computer programming languages, software libraries, protocols, hardware platforms, application architectures, cloud-based services, and the like. Users, business organizations, and other entities may often desire to modernize their various software applications and systems to improve operational performance and increase application availability, to reduce exposure to vulnerabilities (e.g., software crashes, security vulnerabilities, etc.), to migrate applications from non-cloud environments to infrastructure provided by a cloud services provider (e.g., to leverage a cloud service's provider reliable infrastructure, increased performance benefits, etc.), and to enable more efficient ongoing development of the applications, among other possible reasons.

One aspect of modernizing software applications involves the identification of so-called "anti-patterns" associated with a software application. As indicated above, an anti-pattern generally represents any undesirable characteristic of a software application for which a known, better software development pattern exists. While a software application containing one or more anti-patterns may generally operate as its developers intended in most environments, the presence of such anti-patterns may cause the application to be ineffective or otherwise experience issues in other execution environments (e.g., in cloud-based environments), when attempting to scale the application, under unexpected input conditions, etc. Thus, it is typically desirable to refactor software applications having identified anti-patterns to replace the anti-patterns with more resilient patterns and better design practices.

The task of identifying the presence of anti-patterns across different types of software applications is itself a challenging problem. For one, the types and diversity of anti-patterns is extensive, and new types of anti-patterns are constantly being discovered as software development patterns change, existing libraries and other code becomes deprecated, etc. Furthermore, while some types of anti-patterns may be particular to one programming language or one type of execution environment, other types of anti-patterns manifest in different ways across different programming languages, execution environments, etc. For these reasons and others, attempting to "hard code" logic into a modernization assessment client application for detecting anti-patterns presents a number of challenges. For example, each time a new anti-pattern is discovered, or an anti-pattern definition changes, developers of a "hard coded" modernization assessment client application would be required to update the client application's implementation and to provide an updated copy of the entire application to any customers using the application in their own computing environment. The rapidly changing and ever-growing nature of anti-pattern detection techniques renders such processes overly burdensome for both the developers of a modernization assessment client application and for users of the application.

The aforementioned challenges, among others, are addressed by an application modernization system that is capable of efficiently identifying an ever-changing collection of anti-patterns in software applications undergoing modernization processes. In some embodiments, an application modernization service maintains a library of anti-pattern definitions represented using a syntax designed to describe various different types of anti-patterns, where the anti-pattern definition library may be stored in one or more files, databases, or other data stores. A modernization assessment client application running in a user's computing environment is further configured to obtain, from the service, anti-pattern definitions relevant to an application undergoing modernization processes in a user's computing environment. As indicated above, because the anti-pattern definitions are managed separately from the modernization assessment client application, the library of anti-pattern definitions can be modified and updated over time without necessitating changes to the implementation of the modernization assessment client application. Among other benefits, the more efficient detection of anti-patterns provided by the application modernization system described herein enables the development of more resilient software applications, smoother migration of software applications to cloud-based environments, and the efficient use of computing resources supporting execution of such applications.

FIG. 1 is a diagram illustrating an environment that enables an application modernization system to identify anti-patterns, including cloud anti-patterns, in software applications. A provider network 100 (or "cloud" provider network 100) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 132 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

A cloud provider network 100 can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

In some embodiments, an application modernization service 102 generally provides various types of software modernization functionality including collecting profile information for applications undergoing modernization processes, generating modernization assessments and recommendations, providing modernization tools, and assisting with modernization processes. In some embodiments, among other features, an application modernization service 102 and a modernization assessment client application 104 collectively provide a system that enables the identification of anti-patterns associated with user's applications (e.g., software application 106) and the generation of modernization assessment reports providing recommendations for tools and techniques for modernizing user's application. As described in more detail herein, the identification of anti-patterns includes the use of one or more anti-pattern analyzer(s) 134 that are each configured to identify the presence of anti-patterns (e.g., anti-patterns 110) based on anti-pattern definitions 112 obtained from an application modernization service 102. In some embodiments, the application modernization service 102 provides the anti-pattern definitions 112 from an anti-pattern library 114 stored in a data store 116 (e.g., one or more files, databases, etc.), where the provided anti-pattern definitions 112 are selected based on application profile data 108 obtained about a software application 106 of interest. Based on any identified anti-patterns 110, and other modernization assessment information collected about the software application 106, the modernization assessment client application 104 generates and sends results, including anti-pattern detection results 118, to the application modernization service 102, where such information can be used to form a comprehensive application modernization assessment report 128 for the software application 106.

For example, at the circle labeled "1" in FIG. 1, a user 120 has installed the modernization assessment client application 104, including the anti-pattern analyzer(s) 134, on a computing device 122 within the user's computing environment 124 (e.g., at an on-premises datacenter or other type of user computing environment) to assist with modernizing a legacy software application 106 running in the user's computing environment 124. The legacy software application 106, for example, may include one or more applications deployed on one or more Linux®-based or Windows®-based hosts and generally represents any type of software that may be executing in a computing environment (e.g., software implementing a web application or service, business application software, etc.). The software application 106 can be a single process or a group of interoperating processes and may execute within a virtualized or non-virtualized execution environment (e.g., the Java® virtual machine (JVM) in the case of a Java application, or any other execution environment for other types of applications). In some embodiments, the software modernization application 104 automatically identifies one or more groups of interoperating processes associated with a software application 106 for the user.

In some embodiments, users (e.g., a user 120) can use a computing device 126 to interact with the modernization assessment client application 104 via a command line interface (CLI), graphical user interface (GUI), or other type of interface. As indicated above, a user might desire to use the modernization assessment client application 104 to assess a software application 106 for modernization tools and recommendations suitable for the application, where the generation of such recommendations can include the identification of anti-patterns associated with the application. As part of the assessment process, in some embodiments, a user invokes an "inventory" command provided by the modernization assessment client 104 and used to identify applications within the user's operating environment 124 that can be assessed (e.g., including software application 106 in the example of FIG. 1). In some embodiments, instead of interacting directly with the modernization assessment client application 104, the user 120 instead interacts with a graphical console or other interface provided by the application modernization service 102. The application modernization service 102 may then in turn instruct a modernization assessment client application 104 or other software agent(s) running in the user computing environment 124 to perform some or all of the operations described in reference to FIG. 1 such as, for example, identifying an inventory of applications, obtaining application profile data for one or more selected applications, and performing various application modernization analyses. In some embodiments, the modernization assessment service 102 may be a part of a migration service of a cloud provider network 100, which assists users with various types of application migration processes.

In some embodiments, once an application of interest is identified based on the inventory process described above or otherwise, the user can then execute an "analyze" command on the identified application. In some embodiments, responsive to an analyze command, at circle "2," the modernization assessment client application 104 analyzes the identified software application 106 and generates application profile data 108 containing the analysis results. The analysis results may include various application attributes such as, for example, an operating system type associated with the application, an operating system version, process identifier, application type, a programming language used to develop the application, a location at which source code for the application is stored (e.g., a source code repository location), application server type and version, database type and version, integrations with other systems, configuration information, architecture type (e.g., monolithic, 3-tier, microservice-based, etc.), application scale (e.g., number of servers, data storage size, source code size), application importance, application dependencies (e.g., on third party software and libraries, other libraries and files, execution environments), application relationships (e.g., network connections, interprocess communications (IPC), remote procedure calls (RPC)), data flow and network throughput, and the like. This application profile data 108 can be used by the modernization assessment client application 104 and application modernization service 102, for example, to identify modernization recommendations and, in the context of anti-pattern detection, to identify possible anti-patterns relevant to design context of the software application 106. In FIG. 1, the numbered circles labeled "3"-"9" illustrate an example process that includes a modernization assessment client application 104 obtaining an anti-pattern inventory 130 based on the profile data 108, obtaining anti-pattern definitions 112 based on the inventory, determining whether the software application 106 exhibits one or more of the anti-patterns (e.g., determining whether the anti-pattern is found in one or more components of the application), and reporting the anti-pattern detection results 118 back to the application modernization service 102.

In some embodiments, at circle "3," the modernization assessment client application 104 initializes one or more anti-pattern analyzer(s) 134. For example, based on attributes of the software application 106 (e.g., including a type of programming language used to implement the application, a type of execution environment in which the application is running, etc.), the assessment application may initialize one or more analyzers 134 used to identify anti-patterns in contexts relevant to the software application 106. As one example, if the application profile data 108 indicates that the software application 106 is implemented in the Java® programming language, the modernization assessment client application 104 may initialize a first analyzer 134 used to identify anti-patterns in Java® source code, a second analyzer 134 used to identify anti-patterns in Java® bytecode, a third analyzer 134 used to identify anti-patterns based on the dynamic execution patterns of a web-based application, and so forth. Similarly, other anti-pattern analyzer(s) 134 may be initialized for applications developed using other programming languages (e.g., C#, Python, etc.). In some embodiments, each of the analyzers 134 may be implemented as separately executable processes, while in other examples one or more analyzers 134 may be implemented as a combined process used to identify anti-patterns in two or more types of programming languages, execution environments, etc.

In some embodiments, at circle "4," the modernization assessment client application 104 requests, from the application modernization service 102, an inventory of potential anti-patterns to be detected in the software application 106 based characteristics of the software application 106 identified in the application profile data 108. For example, the application modernization service 102 may provide an API including an anti-pattern inventory method that enables modernization assessment client application 104 to obtain such anti-pattern inventories. In some embodiments, an anti-pattern inventory 130 request includes some or all of: an identifier of the modernization assessment client application 104 (e.g., including authentication credentials used to authenticate the modernization assessment client application 104), an identifier of the software application 106 (e.g., including a process name, process identifier, etc.), a type of programming language used to develop the software application 106, a type of execution environment in which the application runs, among any other relevant application attributes.

In some embodiments, at circle "5," the application modernization service 102 processes the anti-pattern inventory request received from the modernization assessment client application 104 by generating data identifying an inventory of anti-patterns relevant to the design and operating context of the software application 106. In some embodiments, the application modernization service 102 identifies the inventory of potential anti-patterns from an anti-pattern library 144, where the anti-pattern library 144 represents a comprehensive collection of anti-patterns definitions pertaining to any number of distinct programming languages, execution environments, development patterns, and the like.

The following is an excerpt from one example anti-pattern definition, which may be stored as part of an anti-pattern library 114:

```
:FixedIP
    rdf:type :AntiPattern ;
    rdfs:label "FixedIP"@en ;
    rdfs:comment "Hard coding the IP address of other hosts breaks the
application when we try to port it over to the cloud."@en ;
    :hasCost [
        a :Cost;
        :hasDuration 15 ;
        :hasUnit :Day ;
    ];
    :hasDefinition [
        a :Definition ;
        :hasLanguage :CSharp ;
        :hasRuleSet [
            a :RuleSet ;
            # Find static IP addresses
            :hasSubRuleSet [
            ...
    ];
```

In the example above, the anti-pattern definition relates to detecting the use of fixed IP addresses by an application, which may represent a cloud anti-pattern for applications desired for migration to a cloud-based infrastructure. As shown, the anti-pattern definition includes various attributes such as a label, comments, modernization cost information, an indication of a programming language to which the definition relates, and a rule set for locating the anti-pattern specifically in applications. The anti-pattern library may further include definitions for detecting the same anti-pattern (e.g., use of fixed IP addresses) in other environments, e.g., in Java-based applications, etc. Furthermore, the anti-pattern library 114 can include any number of other types of anti-pattern definitions, each with separate rule sets for various different programming languages or operating environments, such as definitions for detecting use of local database access, detecting the use of IPC, detecting elements in web application configuration files indicative of an anti-pattern, etc.

In some embodiments, the anti-pattern inventory 130 returned to the modernization assessment client application 104 includes identifiers of anti-patterns relevant to the software application 106. For example, if the software application 106 is a web application developed in the Java programming language, the anti-pattern inventory 130 may include identifiers of any anti-pattern definitions from the anti-pattern library that are relevant to either Java applications or web applications, where an identifier of an anti-pattern definition can be any type of identifier (e.g., an alphanumeric identifier) recognized by the application modernization service 102. In some embodiments, the anti-pattern inventory 130 includes only the anti-pattern definition identifiers and does not include the corresponding anti-pattern definitions, with the expectation that the modernization assessment client application 104 separately sends requests for the corresponding anti-pattern definitions as needed. In other embodiments, the anti-pattern inventory 130 includes the anti-pattern definitions 112 to be used by the corresponding anti-pattern analyzer(s) 134 to detect whether one or more of the anti-patterns are present in the software application 106.

Figure 2:
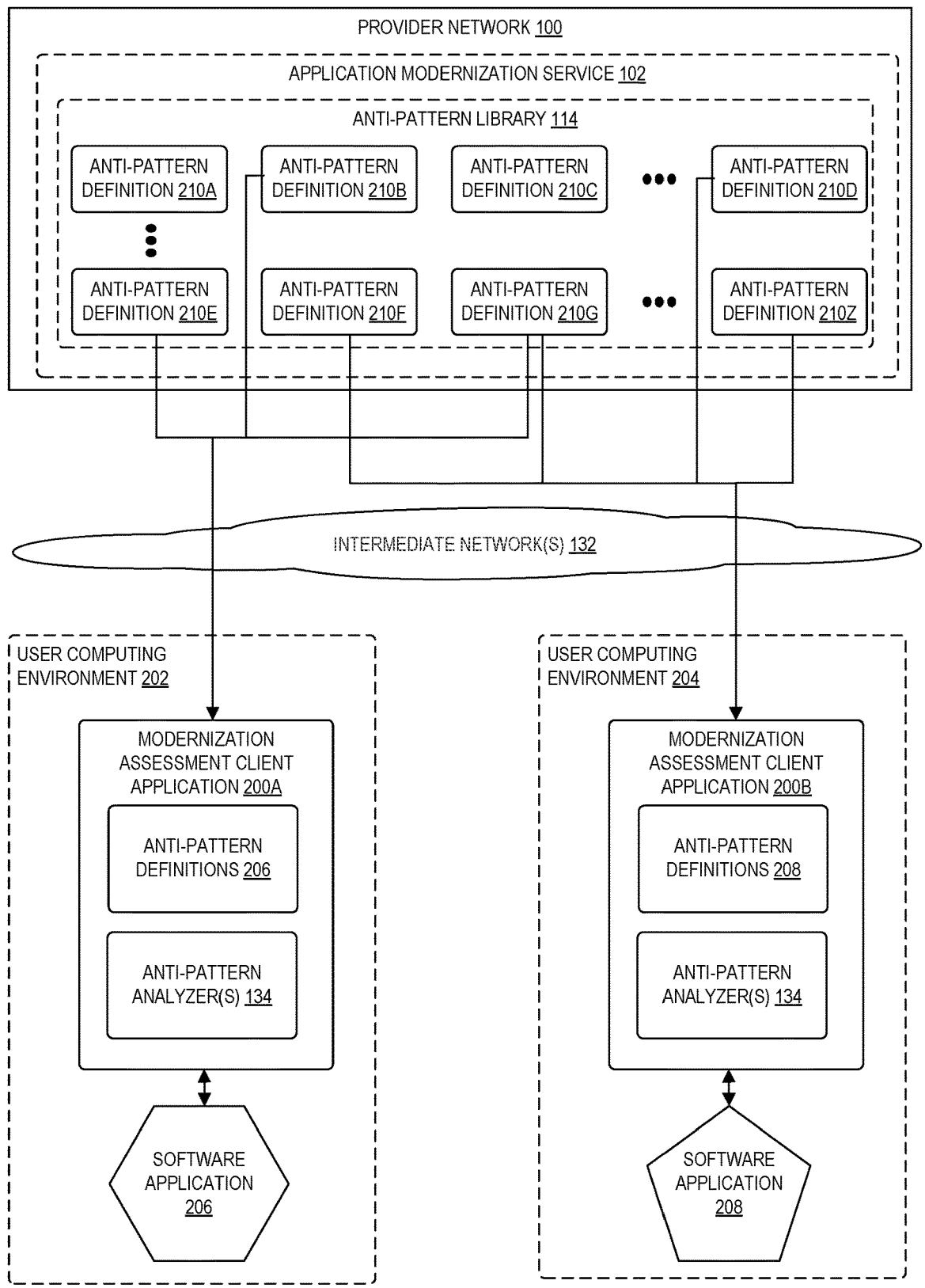
FIG. 2 is a diagram illustrating the filtering of anti-pattern definitions provided by an application modernization service according to application profile data obtained from modernization assessment client applications according to some embodiments.

FIG. 2 illustrates the filtering of anti-pattern definitions provided by an application modernization service 102 according to application profile data 108 obtained from modernization assessment client applications according to some embodiments. In FIG. 2, a modernization assessment client application is installed in each of two separate user computing environments (e.g., modernization assessment client application 200A in user computing environment 202, and modernization assessment client application 200B in user computing environment 204). Each of the user computing environments in FIG. 2 may represent computing environments associated with entirely separate organizations or users, each desiring to modernize respective software applications (e.g., software application 206 in user computing environment 202 and software application 208 in user computing environment 204). In this example, software application 206 and software application 208 represent entirely different types of applications, possibly developed in different programming languages and executing in different execution environments.

In FIG. 2, the anti-pattern library 114 includes some number of anti-pattern definitions 210A, 210B, . . . , 210Z. As indicated above, each of the anti-pattern definitions may be relevant to one or more types of applications, execution environments, application design contexts, etc. In some embodiments, responsive to receiving an anti-pattern inventory request, the application modernization service 102 selects, from the anti-pattern library 114, only those anti-pattern definitions relevant to the software application under analysis. For example, based on application profile information generated by the modernization assessment client application 200A for software application 206, the application modernization service 102 may return a first inventory identifying a first set of anti-pattern definitions (e.g., including anti-pattern definition 210B, anti-pattern definition 210E, and anti-pattern definition 210F). Similarly, responsive to an anti-pattern inventory request from the modernization assessment client application 200B, the application modernization service 102 may identify and return a second inventory including anti-pattern definition 210D, anti-pattern definition 210F, anti-pattern definition 210G, and anti-pattern definition 210Z. In this manner, the respective modernization assessment client applications 200A and 200B can search for only those anti-pattern relevant to the application undergoing the modernization analysis.

Figure 3:
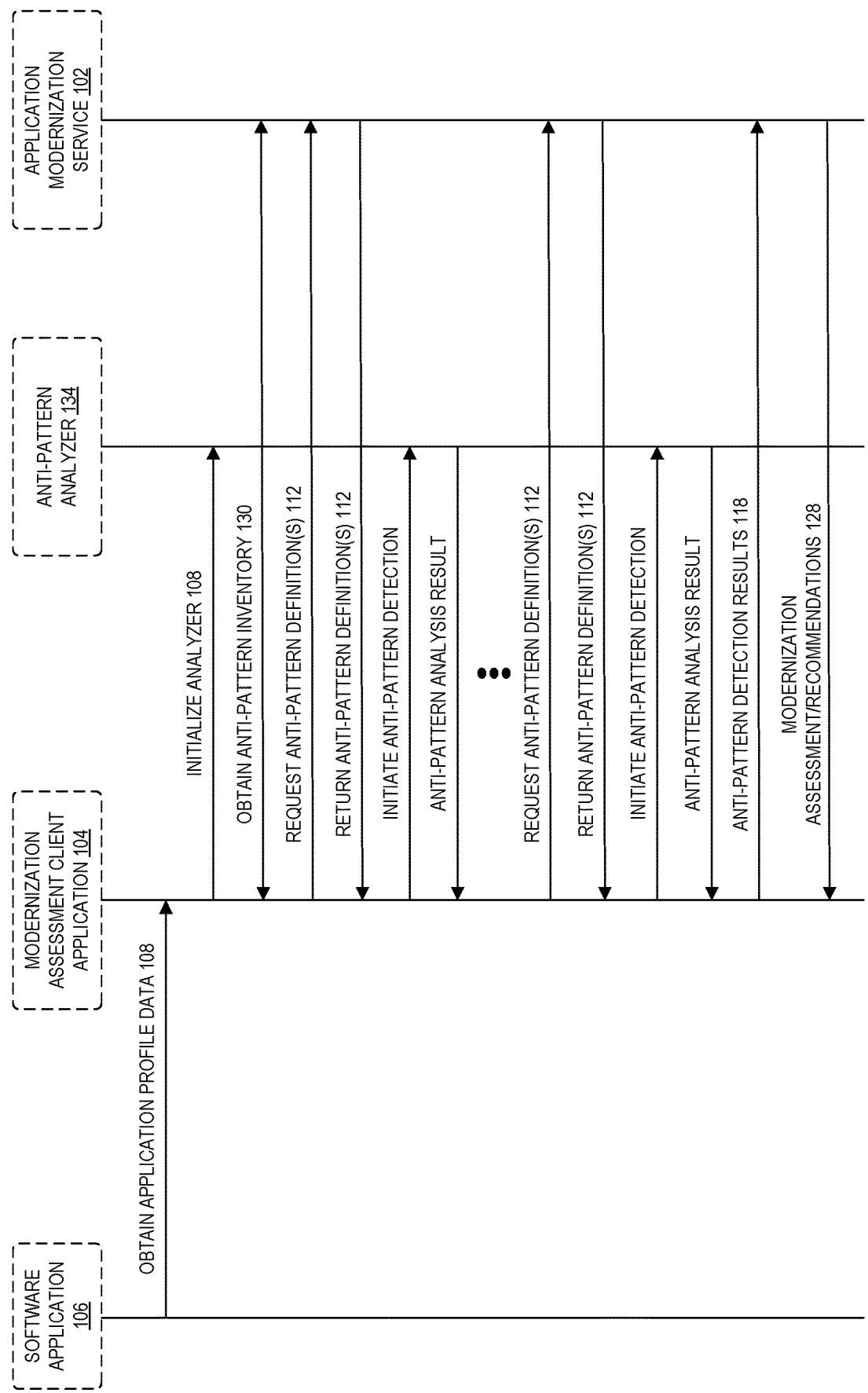
FIG. 3 is a flow diagram illustrating interactions between a modernization assessment client application, one or more anti-pattern analyzers, and a modernization assessment service of a cloud provider network according to some embodiments.

Returning to FIG. 1, in some embodiments, assuming the anti-pattern inventory 130 includes only the identifiers of the anti-pattern definitions, at circle "6," the modernization assessment client application 104 optionally sends one or more requests to obtain anti-pattern definitions 112 based on the anti-pattern identifiers included in the obtained anti-pattern inventory 130. FIG. 3 is a flow diagram illustrating example interactions between a modernization assessment client application 104, one or more anti-pattern analyzers 134, and a modernization assessment service 102 of a cloud provider network to obtain such anti-pattern definitions based on an obtained anti-pattern inventory 130.

As shown in FIG. 3, and as described above in reference to FIG. 1, a modernization assessment client 104 obtains application profile data 108 related to a software application 106 in a user's computing environment. In some embodiments, based on the application profile data 108, the modernization assessment client application 104 initializes one or more anti-pattern analyzers 134 (e.g., based on a programming language used to develop the software application 106, an execution environment associated with the application, etc.). In some embodiments, the modernization assessment client application 104 subsequently obtains an anti-pattern inventory 130 identifying anti-pattern definitions relevant to the software application 106.

In some embodiments, based on the anti-pattern inventory 130, the modernization assessment client application 104 sends one or more anti-pattern definition requests to the application modernization service 102. For example, the modernization assessment client application 104 may send a request for each anti-pattern individual individually (e.g., where the request specifies a particular anti-pattern definition identifier from the inventory), receive the anti-pattern definition from the application modernization service 102, use an anti-pattern analyzer 134 to determine whether the anti-pattern is present in the software application 106, record results of the analysis, and similarly proceed to the next anti-pattern definition identified in the anti-pattern inventory 130. In other embodiments, the modernization assessment client application 104 may request anti-pattern definitions in batches, e.g., where each requests returns two or more anti-pattern definitions. In yet other embodiments, the modernization assessment client application 104 may request a collection of anti-pattern definitions based on the entire anti-pattern inventory 130, e.g., such that only a single anti-pattern definition request is used.

Returning to FIG. 1, in some embodiments, at circle "7," the anti-pattern analyzer(s) 134 process the anti-pattern definitions 112 obtained from the application modernization service 102 against various application artifacts associated with the software application 106, as described above. FIG.

4 is a diagram illustrating the identification of anti-patterns by an anti-pattern analyzer based on anti-pattern definitions obtained from an application modernization service according to some embodiments. For example, FIG. 4 includes an excerpt of the anti-pattern definitions 112 obtained by a modernization assessment client application 104 for execution by an anti-pattern analyzer 134 against various application artifacts 402 such as, for example, source code 404, configuration files 406, and bytecode 408.

As shown in FIG. 4, the excerpt of the anti-pattern definition 112 includes various information that can be used by a generic function (e.g., one or more of analysis functions 400 implemented by one or more anti-pattern analyzers 134) to determine whether a particular anti-pattern is present in the application artifacts 402 associated with software application 106. In this example, the anti-pattern definition relates to the detection of the use of fixed IP addresses by the software application 106. The analysis functions 400 relevant to the anti-pattern definition may be configured, for example, to search for the presence of code packages used in the source code 404, the presence of one or more methods or classes in the source code 404, the presence of attributes or values in various configuration files 406, in bytecode 408 that has been disassembled, and the like. In some embodiments, the anti-pattern definitions 112 may define the presence of an anti-pattern based on a combination of one or more software application attributes expressed using logical connectives, e.g., only if a specified package name and a specified method name is detected; if a class name is detected or if a configuration attribute is detected; only if a specified code package is detected or if a specified method name and method parameter is detected, etc. As illustrated, the logic of the analysis functions 400 is independent from the anti-pattern definitions 112 and, thus, anti-pattern definitions 112 can be modified or supplemented without a change to the generic analysis functions 400, and vice versa.

Returning to FIG. 1, in some embodiments, at circle "8," the modernization assessment client application 104 returns modernization assessment results including anti-pattern detection results 118. For example, the modernization assessment results may include various profile information gathered about the software application 106, the results of other modernization assessments performed by the application (e.g., assessments related to containerizing the application, identifying suitable modernization tools for the application, etc.), and further include an indication of any anti-patterns detected by the anti-pattern analyzers(s) 134 based on the obtained anti-pattern definitions. In some embodiments, the results of the anti-pattern analysis may also be provided locally to a user 120 via a CLI or other interface.

In some embodiments, at circle "9," the application modernization service 102 generates, based in part on the anti-pattern detection results 118, an application modernization assessment report 128. In some embodiments, the application modernization assessment report 128 includes various modernization recommendations and other information obtained about the software application 106. For example, the application modernization assessment report may include information from the obtained profile data 108, information about identified anti-patterns 110, information about recommendation modernization strategies and modernization tools that can be used to modernize the software application 106, where the recommendations can include recommendations for addressing one or more identified anti-patterns 110 (e.g., recommendations to refactor the associated code, recommendations for alternative software design patterns or tools to use, etc.).

In some embodiments, one or more of the identified anti-patterns 110 may be associated with a severity level identified in the application modernization assessment report 128, where a severity level may indicate that the anti-pattern is of low severity and the application can be migrated to a cloud services provider with minimal effects, of medium severity and certain aspects of the application may not operate as intended in a cloud-based environment, or of high severity and will prevent the implementation of the application in a cloud-based environment, etc. In some embodiments, one or more of the identified anti-patterns 110 are associated with an anti-pattern category defined by the application modernization service 102. An anti-pattern category may be used to group a collection of similar anti-patterns, where the category may be further associated with a collection of modernization tools and recommendations that may be used to address some or all of the anti-patterns in the same category. In some embodiments, the information associated anti-patterns to anti-pattern categories, and anti-pattern categories to modernization tools and recommendations, is stored in a knowledge base managed by the application modernization service 102. In some embodiments, an application modernization assessment report 128 displays indications of categories associated with identified anti-patterns 110 and further provides modernization tools and recommendations associated with each of the categories.

Figure 5:
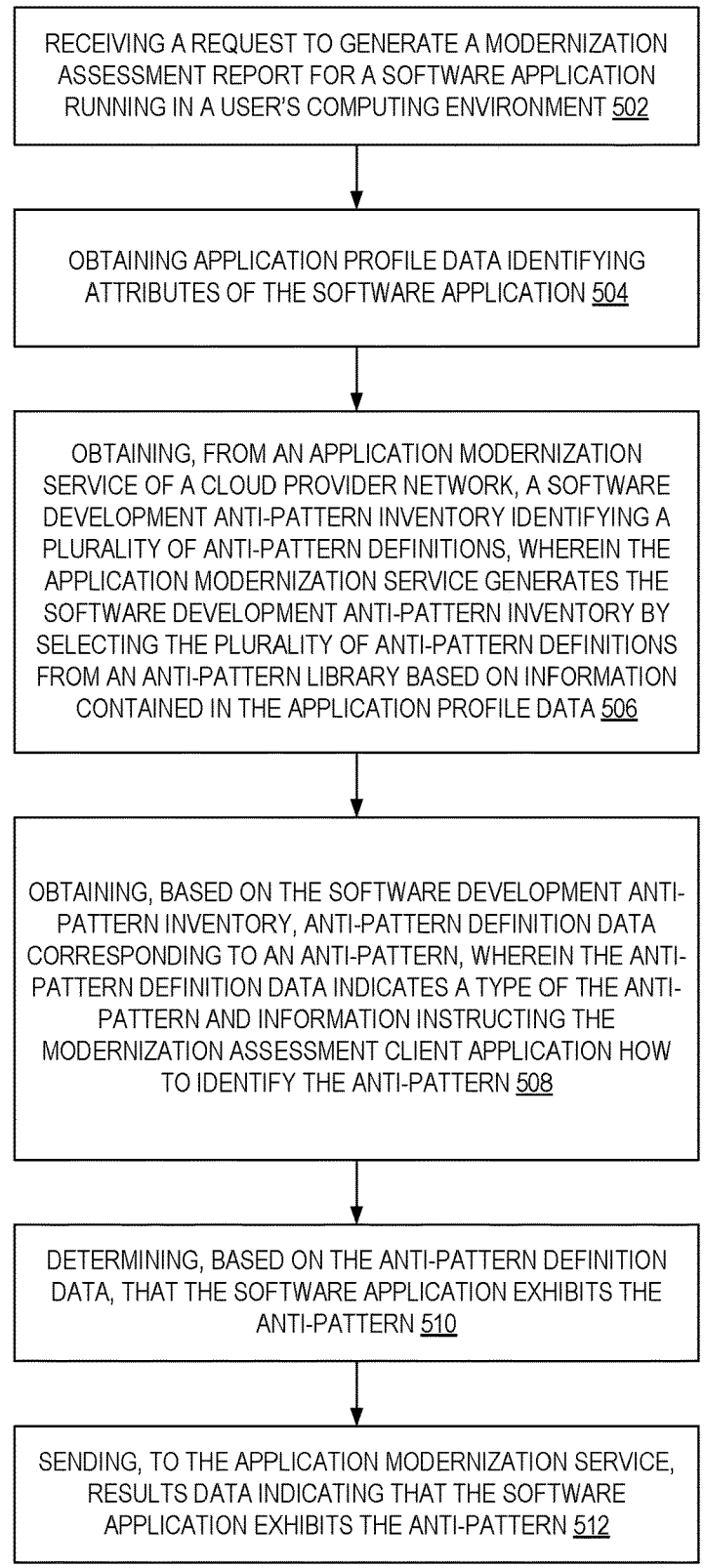
FIG. 5 is a flow diagram illustrating operations of a method for identifying anti-patterns, including cloud anti-patterns, associated with a software application based on anti-pattern definitions provided by a modernization assessment service of a cloud provider network according to some embodiments.

FIG. 5 is a flow diagram illustrating operations 500 of a method for enabling an application modernization system to efficiently identify various types of software development "anti-patterns" (including cloud anti-patterns) associated with software applications undergoing software modernization processes (e.g., as part of modernization processes aimed at migrating users' applications to a cloud service provider's infrastructure) according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by an application modernization service 102 and modernization assessment client application 104 of the other figures.

The operations 500 include, at block 502, receiving a request to generate a modernization assessment report for a software application running in a user's computing environment.

The operations 500 further include, at block 504, obtaining application profile data identifying attributes of the software application.

The operations 500 further include, at block 506, obtaining, from an application modernization service of a cloud provider network, a software development anti-pattern inventory identifying a plurality of anti-pattern definitions, wherein the application modernization service generates the software development anti-pattern inventory based on information contained in the application profile data.

The operations 500 further include, at block 508, obtaining, based on the software development anti-pattern inventory, anti-pattern definition data corresponding to an anti-pattern, wherein the anti-pattern definition data indicates a type of the anti-pattern and information instructing the modernization assessment client application how to identify the anti-pattern. In some embodiments, the anti-pattern definition specifies two or more rules for identifying the anti-pattern, and wherein the two or more rules are joined by one or more logical connectives. In some embodiments, the anti-pattern definition is defined using a formalized anti-pattern definition syntax, and wherein determining that the software application exhibits the anti-pattern includes an anti-pattern analysis engine parsing the anti-pattern definition to determine how to identify the anti-pattern in the software application. In some embodiments, the anti-pattern is a cloud anti-pattern, and wherein the cloud anti-pattern inhibits the software application's ability to be implemented using infrastructure provided by a cloud services provider. In some embodiments, the anti-pattern definition data is specified using a data interchange format based on at least one of: the Resource Description Framework (RDF), JavaScript Object Notation (JSON), Extensible Markup Language (XML), or YAML Ain't Markup Language (YAML). In some embodiments, the anti-pattern definition data indicates that the anti-pattern is associated with an anti-pattern category, and wherein the modernization assessment service generates an assessment report including an indication of one or more modernization recommendations based on the anti-pattern category.

The operations 500 further include, at block 510, determining, based on the anti-pattern definition data, that the software application exhibits the anti-pattern. In some embodiments, the modernization assessment client application includes an anti-pattern analysis engine implementing at least one of the following functions: detecting a filename, detecting a method name in source code, detecting a package name in source code, detecting a class name in source code, detecting annotation text in source code, detecting method parameters in source code, detecting a configuration element name and value, detecting a configuration attribute name and value, detecting a namespace, detecting Internet Protocol (IP) connection type, detecting inter-process communication (IPC), or detecting a library dependency. In some embodiments, the modernization assessment client application includes a plurality of anti-pattern analyzers, and wherein the plurality of anti-pattern analyzers includes at least one of: a source code analyzer, a bytecode analyzer, or a dynamic application analyzer.

The operations 500 further include, at block 512, sending, to the application modernization service, results data indicating that the software application exhibits the anti-pattern. In some embodiments, the application modernization assessment service generates an assessment report including one or more application modernization recommendations, and wherein at least one of the one or more application modernization recommendations recommends a modernization strategy for addressing the anti-pattern. In some embodiments, the anti-pattern is associated with a defined severity level, and wherein the modernization assessment service generates an assessment report including an indication of the severity level.

In some embodiments, the software application is a first software application, and wherein the operations 500 further include adding, by the application modernization service, one or more new anti-pattern definitions to an anti-pattern definition library; receiving, from the modernization assessment client application, a request for an anti-pattern inventory based on second application profile for a second software application; and sending, to the modernization assessment client, a second anti-pattern inventory including anti-pattern definition data for the one or more new anti-pattern definitions.

Figure 6:
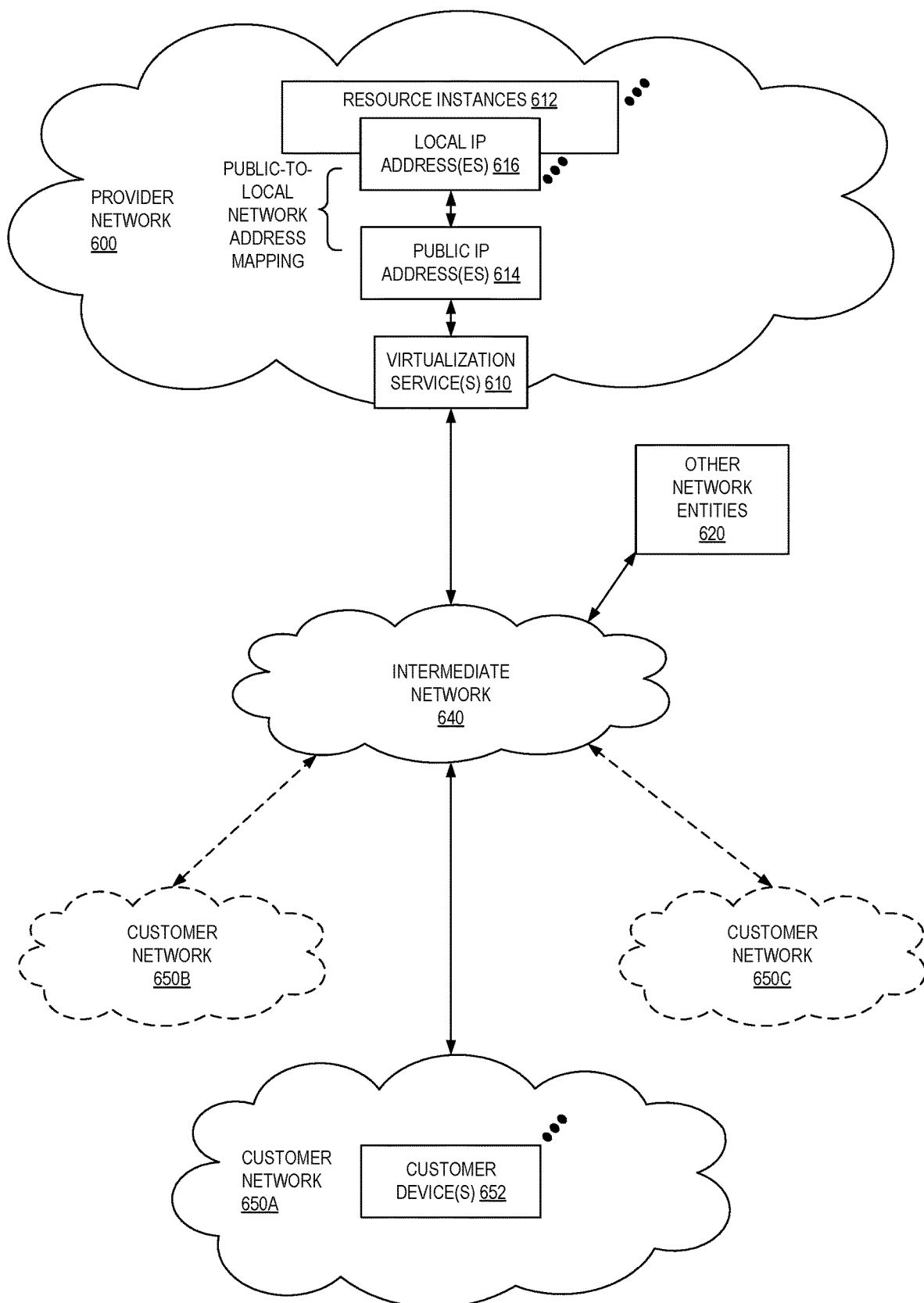
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
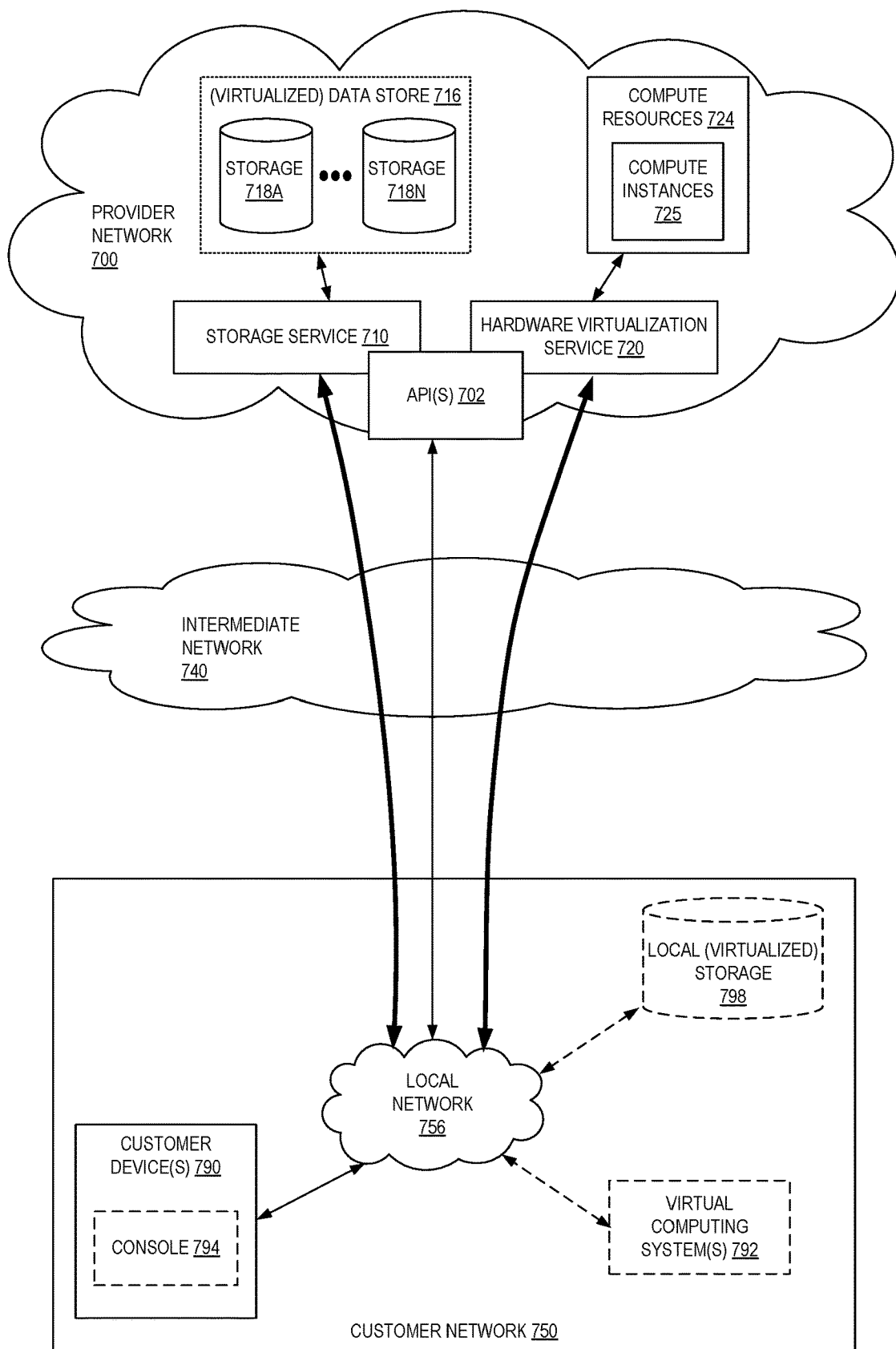
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple compute resources 724 (e.g., compute instances 725 such as VMs) to customers. The compute resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the compute resources 724 to public Internet destinations, and from public Internet sources to the local IP addresses of compute resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Figure 8:
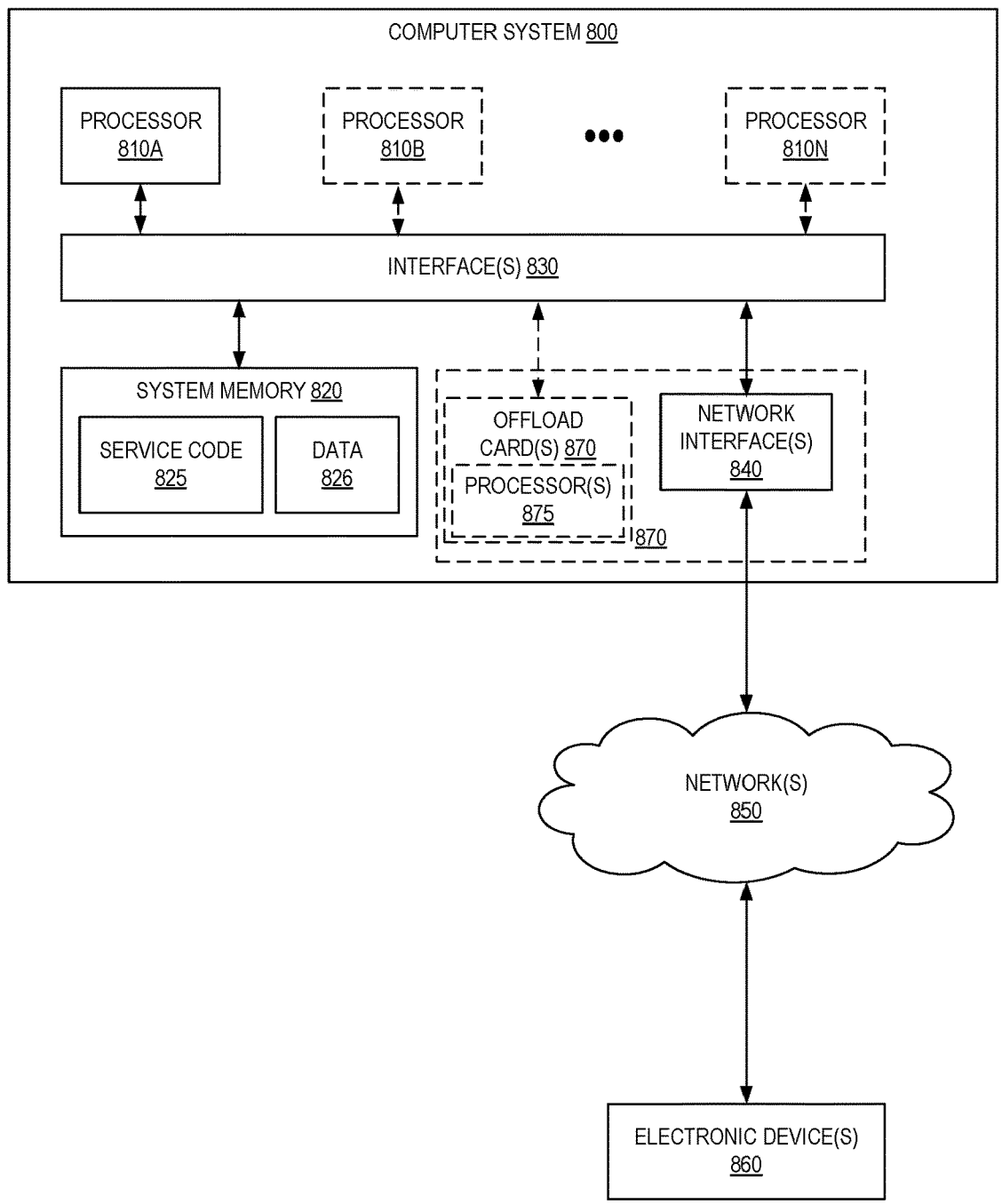
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as service code 825 (e.g., executable to implement, in whole or in part, the application modernization service 102 or modernization assessment client application 104) and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute resources such as compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving, at an application modernization service of a cloud provider network, a request to generate a modernization assessment report for a software application running in a user's computing environment;
obtaining, by a modernization assessment client application executing in the user's computing environment, application profile data identifying attributes of the software application in the user's computing environment;
obtaining, by the modernization assessment client application executing in the user's computing environment from the application modernization service of the cloud provider network, a software development anti-pattern inventory identifying a plurality of anti-pattern definitions, wherein the application modernization service generates the software development anti-pattern inventory by selecting, based on information contained in the application profile data, the plurality of anti-pattern definitions from an anti-pattern definition library stored at a storage resource of the cloud provider network;

obtaining, based on the software development anti-pattern inventory, anti-pattern definition data corresponding to an anti-pattern, wherein the anti-pattern definition data indicates a type of the anti-pattern and information instructing the modernization assessment client application executing in the user's computing environment how to identify the anti-pattern;

determining, by the modernization assessment client application executing in the user's computing environment based on the anti-pattern definition data obtained from the application modernization service of the cloud provider network, that the software application exhibits the anti-pattern; and sending, by the modernization assessment client application executing in the user's computing environment to the application modernization service of the cloud provider network, results data indicating that the software application exhibits the anti-pattern.

2. The computer-implemented method of claim 1, wherein the software application is a first software application and the software development anti-pattern inventory is a first software development anti-pattern inventory, and wherein the method further comprises:

adding, by the application modernization service of the cloud provider network, a new anti-pattern definition to the anti-pattern definition library stored at the storage resource of the cloud provider network;

receiving, by the application modernization service of the cloud provider network from the modernization assessment client application executing in the user's computing environment, a request for a second software development anti-pattern inventory based on a second application profile for a second software application in the user's computing environment; and sending, by the application modernization service of the cloud provider network to the modernization assessment client application executing in the user's computing environment, a second anti-pattern inventory including anti-pattern definition data for the new anti-pattern definition.

3. The computer-implemented method of claim 1, wherein the application modernization service generates an assessment report including an application modernization recommendation recommending a modernization strategy for addressing the anti-pattern.

4. A computer-implemented method comprising:

obtaining, by a modernization assessment client application executing in a computing environment, application profile data identifying attributes of a software application in the computing environment;

obtaining, by the modernization assessment client application executing in the computing environment from an application modernization service of a cloud provider network, anti-pattern definition data corresponding to a software development anti-pattern relevant to the software application, wherein the application modernization service stores the anti-pattern definition data using a storage resource of the cloud provider network, and wherein the anti-pattern definition data indicates a type of the software development anti-pattern and information instructing the modernization assessment client application in the computing environment how to identify the software development anti-pattern;

determining, by the modernization assessment client application executing in the computing environment based on the anti-pattern definition data obtained from the application modernization service of the cloud provider network, that the software application exhibits the software development anti-pattern; and sending, by the modernization assessment client application executing in the computing environment to the application modernization service of the cloud provider network, results data indicating that the software application exhibits the software development anti-pattern.

5. The computer-implemented method of claim 4, wherein the software application is a first software application, and wherein the method further comprises:

adding, by the application modernization service of the cloud provider network, a new anti-pattern definition to an anti-pattern definition library stored at the storage resource of the cloud provider network;

receiving, by the application modernization service of the cloud provider network from the modernization assessment client application executing in the computing environment, a request for an anti-pattern inventory based on a second application profile for a second software application in the computing environment; and sending, by the application modernization service of the cloud provider network to the modernization assessment client application executing in the computing environment, a second anti-pattern inventory including anti-pattern definition data for the new anti-pattern definition.

6. The computer-implemented method of claim 4, wherein the application modernization service generates an assessment report including an application modernization recommendation recommending a modernization strategy for addressing the software development anti-pattern.

7. The computer-implemented method of claim 4, wherein the modernization assessment client application includes an anti-pattern analysis engine implementing at least one of the following functions: detecting a filename, detecting a method name in source code, detecting a package name in source code, detecting a class name in source code, detecting annotation text in source code, detecting method parameters in source code, detecting a configuration element name and value, detecting a configuration attribute name and value, detecting a namespace, detecting Internet Protocol (IP) connection type, detecting inter-process communication (IPC), or detecting a library dependency.

8. The computer-implemented method of claim 4, wherein the anti-pattern definition data specifies two or more rules for identifying the software development anti-pattern, and wherein the two or more rules are joined by at least one logical connective.

9. The computer-implemented method of claim 4, wherein the anti-pattern definition data is defined using a formalized anti-pattern definition syntax, and wherein determining that the software application exhibits the software development anti-pattern includes an anti-pattern analysis engine parsing the anti-pattern definition data to determine how to identify the software development anti-pattern in the software application.

10. The computer-implemented method of claim 4, further comprising:
obtaining, from an application modernization service of a cloud provider network, a software development anti-pattern inventory identifying a plurality of anti-pattern definitions, wherein the application modernization service generates the software development anti-pattern inventory based on information contained in the application profile data; and
wherein the anti-pattern definition data is obtained based on the software development anti-pattern inventory.

11. The computer-implemented method of claim 4, wherein the anti-pattern is a cloud anti-pattern, and wherein the cloud anti-pattern inhibits the software application's ability to be implemented using infrastructure provided by a cloud services provider.

12. The computer-implemented method of claim 4, where the modernization assessment client application includes a plurality of anti-pattern analyzers, and wherein the plurality of anti-pattern analyzers includes at least one of: a source code analyzer, a bytecode analyzer, or a dynamic application analyzer.

13. The computer-implemented method of claim 4, wherein the anti-pattern definition data indicates that the software development anti-pattern is associated with a defined severity level, and wherein the application modernization service generates an assessment report including an indication of the defined severity level.

14. The computer-implemented method of claim 4, wherein the anti-pattern definition data indicates that the software development anti-pattern is associated with an anti-pattern category, and wherein the application modernization service generates an assessment report including an indication of a modernization recommendation based on the anti-pattern category.

15. A system comprising:
a first one or more electronic devices implementing an application modernization assessment service in a cloud provider network, the application modernization assessment service including instructions that upon execution by one or more processors of the first one or more electronic devices cause the application modernization assessment service to:
receive, from a modernization assessment client application executing in a user's computing environment, a request for a software development anti-pattern inventory, wherein the request includes information contained in application profile data obtained by the modernization assessment client application executing in the user's computing environment,
generate the software development anti-pattern inventory based on the information contained in the application profile data,
send the software development anti-pattern inventory to the modernization assessment client application executing in the user's computing environment,
receive, from the modernization assessment client application, a request for anti-pattern definition data corresponding to an anti-pattern, and
send, to the modernization assessment client application executing in the user's computing environment, the anti-pattern definition data including an anti-pattern definition for the anti-pattern; and
a second one or more electronic devices implementing the modernization assessment client application in the user's computing environment, the modernization assessment client application including instructions that upon execution by one or more processors of the second one or more electronic devices cause the modernization assessment client application to:
receive a request to generate a modernization assessment report for a software application running in the user's computing environment,
obtain application profile data identifying attributes of the software application,
send, to the application modernization service in the cloud provider network, the request for the software development anti-pattern inventory,
obtain, from the application modernization service in the cloud provider network based on the software development anti-pattern inventory, the anti-pattern definition data including the anti-pattern definition for the anti-pattern,
determine, based on the anti-pattern definition data, that the software application exhibits the anti-pattern, and
send, to the application modernization service in the cloud provider network, results data indicating that the software application exhibits the anti-pattern.

16. The system of claim 15, wherein the software application is a first software application and the software development anti-pattern inventory is a first software development anti-pattern inventory, and wherein the application modernization service further includes instructions that upon execution cause the application modernization service to:
add a new anti-pattern definition to an anti-pattern definition library stored at a storage resource of the cloud provider network;
receive, from the modernization assessment client application executing in the user's computing environment, a request for a second software development anti-pattern inventory based on a second application profile for a second software application in the user's computing environment; and
send, to the modernization assessment client application executing in the user's computing environment, a second anti-pattern inventory including anti-pattern definition data for the new anti-pattern definition.

17. The system of claim 15, wherein the application modernization service generates an assessment report including an application modernization recommendation recommending a modernization strategy for addressing the anti-pattern.

18. The system of claim 15, wherein the modernization assessment client application includes an anti-pattern analysis engine implementing at least one of the following functions: detecting a filename, detecting a method name in source code, detecting a package name in source code, detecting a class name in source code, detecting annotation text in source code, detecting method parameters in source code, detecting a configuration element name and value, detecting a configuration attribute name and value, detecting a namespace, detecting Internet Protocol (IP) connection type, detecting inter-process communication (IPC), or detecting a library dependency.

19. The system of claim 15, wherein the anti-pattern definition specifies two or more rules for identifying the anti-pattern, and wherein the two or more rules are joined by at least one logical connective.

20. The system of claim 15, wherein the anti-pattern definition is defined using a formalized anti-pattern definition syntax, and wherein determining that the software application exhibits the anti-pattern includes an anti-pattern analysis engine parsing the anti-pattern definition to determine how to identify the anti-pattern in the software application.

\* \* \* \* \*